(12) United States Patent
Lee et al.

(10) Patent No.: US 6,947,891 B2
(45) Date of Patent: Sep. 20, 2005

(54) EFFICIENT SPEECH RECOGNITION SYSTEM BASES ON AN AUDITORY MODEL

(75) Inventors: Soo Young Lee, Taejon (KR); Chang Min Kim, Taejon (KR)

(73) Assignee: Korea Advanced Institute of Science & Technology, Taejon (KR)

( * ) Notice: Subject to any disclaimer, the term of this patent is extended or adjusted under 35 U.S.C. 154(b) by 772 days.

(21) Appl. No.: 09/765,650

(22) Filed: Jan. 22, 2001

(65) Prior Publication Data

US 2002/0013702 A1 Jan. 31, 2002

(30) Foreign Application Priority Data

Jun. 26, 2000 (KR) .................................. 10-2000-35286

(51) Int. Cl.[7] .......................... G10L 15/04; G10L 15/16
(52) U.S. Cl. ...................... 704/232; 704/234; 704/253
(58) Field of Search ............................... 704/231, 232, 704/233, 234, 251, 253, 200.1

(56) References Cited

U.S. PATENT DOCUMENTS

| | | | |
|---|---|---|---|
| 5,522,012 A | * 5/1996 | Mammone et al. | 704/250 |
| 5,734,793 A | * 3/1998 | Wang | 704/232 |
| 5,749,072 A | * 5/1998 | Mazurkiewicz et al. | 704/275 |
| 6,324,510 B1 | * 11/2001 | Waibel et al. | 704/256 |
| 6,411,926 B1 | * 6/2002 | Chang | 704/221 |
| 6,678,656 B2 | * 1/2004 | Macho et al. | 704/233 |
| 6,735,566 B1 | * 5/2004 | Brand | 704/256 |

OTHER PUBLICATIONS

Z. Jiang, "FIR filter design and implementation with powers-of-two coefficients," 1989 International Conference on Acoustics, Speech, and Signal Processing, 1989. ICASSP-89. May 23–26, 1989, vol. 2, pp. 1239 to 1242.*

Zhao et al., "A simple design of FIR filters with powers-of-two coefficients," IEEE Transactions on Circuits and Systems, May 1988, vol. 35, Issue 5, pp. 566 to 570.*

Benvenuto et al., "Results on the application of simulated annealing algorithm for the design of digital filters with powers-of-two coefficients," ICASSP-90, Apr. 3–6, 1990, vol. 3, pp. 1301 to 1304.*

(Continued)

*Primary Examiner*—Martin Lerner
(74) *Attorney, Agent, or Firm*—Bacon & Thomas, PLLC

(57) ABSTRACT

A speech recognition system that is insensitive to external noise and applicable to actual life includes an A/D converter that converts analog voice signals to digital signals. An FIR filtering section employs powers-of-two conversion to filter the digital signals converted at the A/D converter into numbers of channels. A characteristic extraction section immediately extracts speech characteristics having strong noise-resistance from the output signals of the FIR filtering section without using additional memories. A word boundary detection section discriminates the information of the start-point and the end-point of a voice signal on the basis of the characteristics extracted by the characteristic extraction section. Finally, a normalization/recognition section codes and outputs the final result by carrying out a timing normalization and a classifying process using a radial basis function (RBF) neural network on the basis of the voice characteristics provided by the characteristic extraction section and the information for the start-point and the end-point of the voice signal from the word boundary detection section.

8 Claims, 4 Drawing Sheets

OTHER PUBLICATIONS

Gentili et al., "Efficient genetic algorithm design for power-of-two FIR filters," 1995 International Conference on Acoustics, Speech, and Signal Processing, 1995. ICASSP-95. May 9-12, 1995, vol. 2, pp. 1268 to 1271.*

Hoyt et al., "Detection of human speech using hybrid recognition models," Pattern Recognition, 1994. vol. 2—Conference B: Computer Vision & Image Processing., Proceedings of the 12th IAPR International, Oct. 9-13, 1994, vol. 2, pp. 330 to 333.*

Karam et al., "Optimal feature vector for speech recognition of unequally segmented spoken digits," 2000 Canadian Conference on Electrical and Computer Engineering, Mar. 7-10, 2000, vol. 1, pp. 327 to 330.*

Singer et al., "A speech recognizer using radial basis function neural networks in an HMM framework," 1992 IEEE International Conference on Acoustics, Speech, and Signal Processing, 1992. ICASSP-92. Mar. 23-26, 1992, vol. 1, pp. 629 to 632.*

S. Renels, "Radial basis function network for speech pattern classification," Electronics Letters, Mar. 30, 1989, vol. 25, Issue 7, pp. 437 to 439.*

* cited by examiner

Case1

Case2

EFFICIENT SPEECH RECOGNITION SYSTEM BASES ON AN AUDITORY MODEL

BACKGROUND OF THE INVENTION

1. Field of the Invention

The present invention relates to a speech recognition system, and more particularly relates to a speech recognition system that is insensitive to external noise, carries out an efficient calculation, and is applicable to actual life thereby.

2. Description of the Related Art

Recently, as the technique of speech recognition field is developed, the usage of speech recognition is diversified.

FIG. 1 is a block diagram roughly illustrating the structure of a prior speech recognition system.

As described in FIG. 1, a speech recognition system mainly comprises a characteristic extraction section (2) and a recognizer (4). In other words, a prior characteristic extraction method such as a linear prediction coding analysis (LPC) has been used for an input voice signal characteristic extraction, and a hidden Markov Model (HMM) receiver has been widely used.

In addition, as a speech recognition system applicable to real electronic products, a speech recognition system using an auditory model and a neural network has been developed. One of the prior speech recognition systems having the features described above is disclosed in Korean patent No. 180651 registered on Dec. 2, 1998.

Looking into the patented invention mentioned above, it comprises an A/D converter that converts analog voice signals to digital signals, a filtering section that filters the 12-bit digital signals converted at the A/D converter into prescribed numbers of channels, a characteristic extraction section that extracts voice characteristics having strong noise-resistance from the output signals of the filtering section and outputs the extraction result, a word boundary detection section that discriminates the information of the start-point and the end-point of the voice signal on the basis of the voice signal converted into the digital signal, and an analysis/transaction section that codes and outputs the final result by carrying out a timing normalization and a classifying process using a neural network on the basis of the voice characteristics provided by the characteristic extraction section and the information of the start-point and the end-point of voice signal from the word boundary detection section.

However, since the prior speech recognition system described above employs LPC method or the like as a characteristic extraction method and HMM as a recognizer, it has difficulties in embodying an ASIC. And it is therefore difficult to be applied to actual life because it has to handle software only or construct a complex system using DSP.

Besides, the prior art has more problems that the power consumption is large because digital signals converted at A/D converter are filtered at filtering section into numbers of channels, and the efficiency is low because it detects the word boundary first and extracts voice characteristics thereafter.

SUMMARY OF THE INVENTION

The present invention is proposed to solve the problems of the prior art mentioned above. It is therefore the object of the present invention to provide a speech recognition system that is insensitive to external noise and applicable to actual life by using auditory model and a neural network. It is another object of the present invention to provide a speech recognition system of which the power consumption is small and the efficiency is high by employing a FIR filter and establishing a filter-bank with only additions and shift-operations by using powers-of-two conversion.

To achieve the objects mentioned above, a voice recognition system in accordance with the present invention comprises: an A/D converter that converts analog voice signals to digital signals; an FIR filtering section that employs powers-of-two conversion to filter the 12-bit digital signals converted at the A/D converter into 16 channels; a characteristic extraction section that extracts voice characteristics having strong noise-resistance from the output signals of the FIR filtering section and outputs the extraction result; a word boundary detection section that discriminates the information of the start-point and the end-point of voice signal on the basis of the noise-resistant voice characteristics extracted at the characteristic extraction section; and a normalization/recognition section that codes and outputs the final result by carrying out a timing normalization and a classifying process using a neural network on the basis of the voice characteristics provided by the characteristic extraction section and the information of the start-point and the end-point of voice signal from the word boundary detection section.

DESCRIPTION OF THE NUMERICS ON THE MAIN PARTS OF THE DRAWINGS

Figure 1:
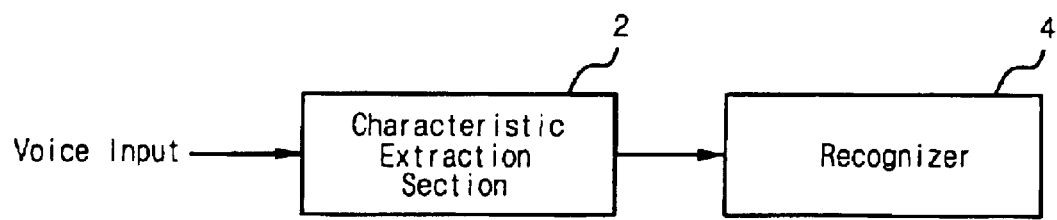
FIG. 1 is a block diagram roughly illustrating the structure of a prior speech recognition system.

2: a characteristic extraction section
4: a recognizer
10: an FIR filtering section
20: a characteristic extraction section
30: a word boundary detection section
40: a normalization/recognition section

DETAILED DESCRIPTION OF THE EMBODIMENTS

Hereinafter, referring to appended drawings, the structures and the operation procedures of an embodiment of the present invention are described in detail.

Figure 2:
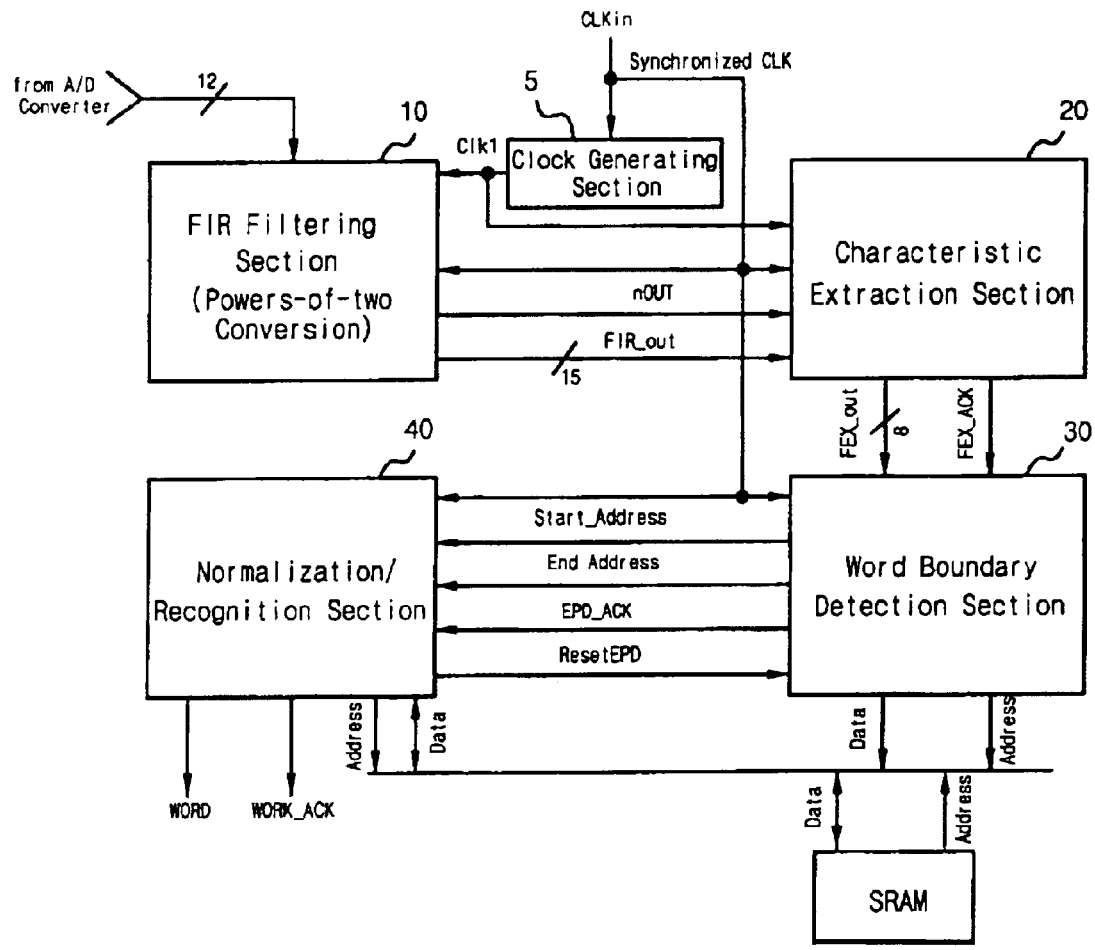
FIG. 2 is a block diagram illustrating the structure of an embodiment of the speech recognition system in accordance with the present invention.

FIG. 2 is a block diagram illustrating the structure of an embodiment of the speech recognition system in accordance with the present invention.

Referring to FIG. 2, a speech recognition system in accordance with the present invention comprises an FIR filtering section (10) that receives input signals from an A/D converter, a characteristic extraction section (20) connected to the FIR filtering section (10), a clock generating section (5) that outputs clocks to the FIR filtering section (10) and the characteristic extraction section (20), a word boundary detection section (30) connected to the characteristic extraction section (20), a normalization/recognition section (40) connected to the word boundary detection section (30), and a SRAM that is connected to the word boundary detection section (30) and to the normalization/recognition section (40).

The A/D converter is constructed to receive analog input voice signals, convert the signals to 12-bit digital voice signals, and output the converted signals to the filtering section (10).

The filtering section (10) is constructed to filter the 12-bit digital signals converted by the A/D converter into 16 channels and output the filtered signals to the characteristic extraction section (20) The filtering section (10) comprises a filter-bank having 16 channels.

The frequency characteristics of the channels are set on the basis of the data obtained from mammalian ear.

The filter comprises 100 trays of FIR filters and constructs a filter-bank with only additions and shift-operations by using powers-of-two conversion. Here, the powers-of-two conversion is to represent a number in the form of the following equation:

$$\sum_n c_n 2^n, c_n = -1, 0, +1$$

By using the characteristic shown in Equation 1, an FIR filter can be achieved with only adders and shifters without using a multiplier. By finding a conversion in which the number of $c_n$ that has the value of '0' becomes maximum in the process as shown in Equation 1, an FIR filter, which is able to reduce the area and operation speed simultaneously, can be designed.

In addition, the FIR filter required for an embodiment of the present invention is a cochlea FIR filter having limited coefficients. The number of coefficients increases in general powers-of-two conversion, however, in the present invention, a command language having coefficients similar to that of the filter that does not use powers-of-two conversion is designed by using the characteristics of cochlea filter required for the present invention.

The characteristic extraction section (20) is constructed to extract voice characteristics having strong noise-resistance from the output signals of the filtering section (10) and output the extraction result to the word boundary detection section (30) and the normalization/recognition section (40).

The characteristic extraction section (20) extracts voice characteristics on the basis of human auditory model, and it is designed to extract characteristic vectors in real-time by buffering the characteristic vectors themselves.

The word boundary detection section (30) is constructed to discriminate the information of the start-point and the end-point of voice signal on the basis of the noise-resistant voice characteristics from the characteristic extraction section and output the information to the normalization/recognition section (40). The word boundary detection section (30) discriminates the information of the start-point and the end-point of the signal from the characteristic vector of the voice signal at each channel.

The normalization/recognition section (40) screens among 50 words extracted at the characteristic extraction section (20) and carrying out a timing normalization based on the information of the start-point and the end-point of voice signal from the word boundary detection section (30). Here, the normalization method used in this section is a non-linear trace segment method.

The normalization block receives the addresses of the start-point and the end-point from the end-point extraction block and normalizes them into 16 channels, 64 frames to have predetermined energies. In addition, after obtaining the output values 50 standard words by inputting the normalized data into a neural network of radial basis function (RBF), it codes the word having the maximum value among the output values into 6-bit and outputs it.

The data of weighting factors of neural network, which varies with the voice to be classified, is stored in an external memory, and thereby it can be easily applied to different voices by changing memory data.

The operation principles of the embodiment of the present invention, which is constructed to have the structure described above, are now explained in detail.

Figure 3A:
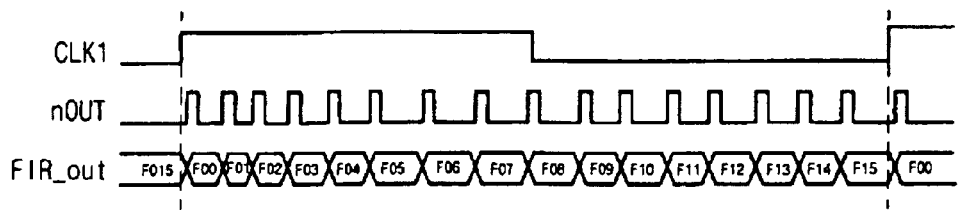
FIG. 3(a)~3(c) are views illustrating timings to explain the operation principles of the system described in FIG. 2.

The filtering section (10) filters the 12-bit digital signals converted by the A/D converter into 16 channels and outputs the filtered signals to the characteristic extraction section (20). Here, FIR_out and nOUT are 12-bit signals, and they are synchronized with the sampling frequency, Clk1 (11.056 KHz) and CLKin (9 MHz) required for chip computing. The timing is shown in FIG. 3(a).

Figure 3B:
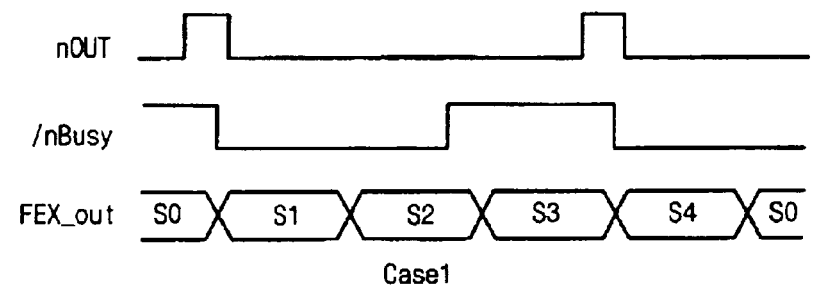
Figure 3B:
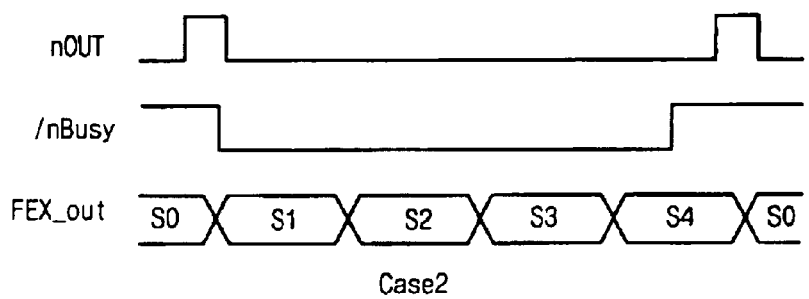

The characteristic extraction section (20) extracts voice characteristics having strong noise-resistance from the output signals of the filtering section (10) and outputs the extracted signal to the word boundary detection section (30) and the normalization/recognition section (40). In other words, FEX_out is a transmission signal of the frequency value, which is the output of the characteristic extraction section (20), to the word boundary detection section (30). The signal is 8-bit and synchronized with clk1 at every 10 ms (110 samples). The timing is shown in FIG. 3(b).

The signal from the characteristic extraction section (20) is synchronized with clk1 and nOUT signal from the FIR filtering section (10).

nOUT is a control signal that is activated at a rising edge whenever an FIR_out is output from the FIR filtering section.

On the other hand, nBusy is an internal control signal of the characteristic extraction section (20) and activated at a falling edge.

SO represents an initial stage before nBusy and nOUT are activated. At S1 stage, it calculates the sum of the energies between the zero-crossing points when nOUT and nBusy are activated and stores the output from the FIR filtering section (10).

At S2 stage, it searches for zero-crossing points and calculates crossing ratio between crossing points.

At S3 stage, it selects a characteristic vector channel to be accumulated and checks the selected channel to be valid.

At S4 stage, it accumulates characteristics in the channel selected at S3. Case 1 shows that, if not finding a zero-crossing point, S2 stage returns back to initial stage, SO. And Case 2 shows the procedure of accumulating characteristic vectors into the selected channel.

Figure 4A:
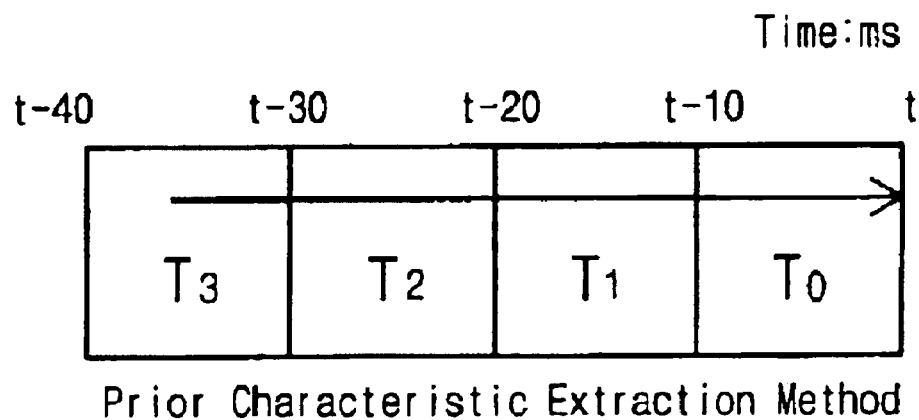
FIGS. 4A and 4B are views illustrating the characteristic extraction method.
Figure 4B:
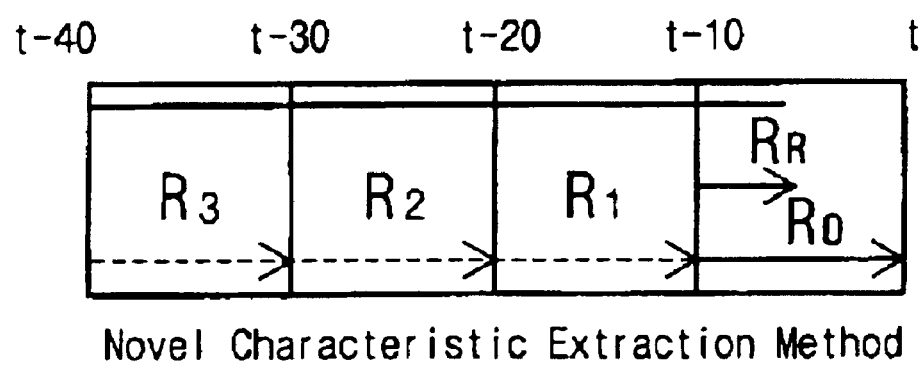

FIG. 4 is a view illustrating the characteristic extraction method.

As described in FIG. 4, it extracts a characteristic vector in real-time by buffering the voice characteristic vector itself. A voice characteristic vector is obtained by calculating a timing information and an accumulated energy value at zero-crossing point of each channel. Here, the frequencies of zero-crossing points are different at each channel. So, it extracts characteristic vectors by using windows having different lengths for the channels to maintain the frequencies constant.

A prior extraction method described in FIG. 4 stores required FIR filter output at each channel into a memory, and thereafter detects zero-crossing points by using this output and extracts characteristic vectors. If using this kind of extraction method, it requires a large memory as well as a large number of operations.

The information required for extracting characteristic vectors is the time interval between the maximum point and the zero-crossing point. And this can be directly calculated when the signal crosses a zero point. Therefore, by continually accumulating the characteristic vectors using the information at zero-crossing points without storing the FIR filter output, the required size of memory can be largely reduced as well as the number of required operations.

For calculating the characteristic vectors, it needs to continually accumulate characteristic vectors and buffer them to next register. Therefore, it requires a register for accumulating the characteristic vectors between the 110 samples, registers for accumulating the characteristic vectors only for the valid time of each channel, and a buffering register for storing the characteristic vectors for the total time interval (110 samples).

In FIG. 4, RR represents a valid register, and R0 is a register for accumulating the value of the characteristic vector to be buffered to the next accumulation register. Therefore, the characteristic vector at time t can be obtained by adding the stored values in the above registers in sequence, and the memory for storing the filter-bank output can be reduced thereby.

Characteristic vectors are extracted between the 110 samples, and the final characteristic vector can be easily calculated by adding the valid accumulation register(RR) and the buffered registers (R1, R2, R3). RR is set to be 0 and the registers are buffered in the sequence of R0→R1→R2→R3.

The normalization/recognition section (40) codes the final result after classifying process based on voice characteristics provided by the characteristic extraction section (20) and the information of the start-point and the end-point of voice signal from the word boundary detection section (30). Here, start-tag and end-tag are signals indicating that start-point and end-point of a word are found, and the two signals are to have one synchronized clock space at front and back respectively to be checked constantly at rising edge of CLKin by the normalization/recognition section (40).

Using trace segment method as a normalization method, memory operations and clocks are reduced by embodying a divider using a multiplier.

The word boundary detection section (30) and the normalization block carries out memory operations because they have to look up the characteristic vectors. Therefore, they are constructed with RBF network that mainly performs memory operations.

On the other hand, the normalization/recognition section (40) can notice the location of the present feature memory(it memorizes FEX_out from the characteristic extraction section) by SRAM (Feature Memory Address) signal synchronized with CLKin. In other words, since incoming signals from the word boundary detection section (30) could be continually input even after the internal memory of the normalization/recognition section (40) is fully equipped, the normalization/recognition section (40) is designed not to overwrite data at the same place by checking it by itself whether the memory is full. And the word boundary detection section (30) must not transfer the end-tag that is over the start-tag, and it has to transfer start-tag-1 for the case like this.

Figure 3C:
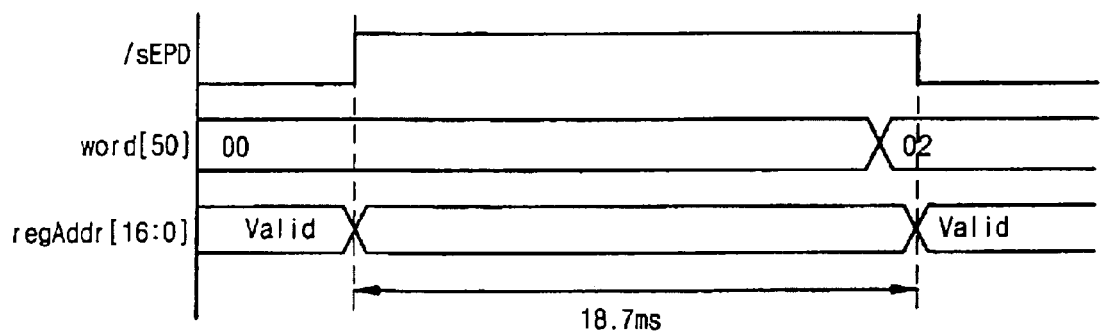

As shown in FIG. 3(c), since the recognition result outputs at 18.7 ms after the end-point extraction, it fits for the real-time recognition.

The 12-bit digital voice data comes out from the A/D converter is read at the rising edge of Clk1 by the filtering section (10) and the characteristic extraction section (20). Therefore, the external 12-bit digital signals that convert voice signals to digital signals have to finish conversion before at least one system clock at the rising edge of Clk1.

A non-synchronized SRAM is used in the embodiment of the present invention, and it stores the characteristics from the characteristic extraction section (20) and is only read by the normalization/recognition section (40). Reading operation can be continuously carried out, however, writing operation is carried out simultaneously with reading operation since a writing signal has to be produced after establishing an address value.

As mentioned thereinbefore, the present invention provides a speech recognition system having eh following advantageous characteristics:

First, by using a fast characteristic extraction method with less number of memory operations, it reduces power consumption during the characteristic extraction process.

And second, by extracting the voice characteristics first and thereafter detecting the word boundary by using these characteristics, it is insensitive to external noise, the calculation is efficient, and it is easy to construct the hardware. Therefore, it is very much applicable to actual life.

Since those having ordinary knowledge and skill in the art of the present invention will recognize additional modifications and applications within the scope thereof, the present invention is not limited to the embodiments and drawings described above.

What is claimed is:

1. A speech recognition system comprising:
    an A/D converter that converts analog voice signals to digital signals;
    an FIR filtering section that employs powers-of-two conversion to filter 12-bit digital signals converted at said A/D converter into prescribed numbers of channels;
    a characteristic extraction section that extracts voice characteristics having strong noise-resistance from the output signals of said FIR filtering section;
    a word boundary detection section that discriminates information of a start-point and an end-point of a voice signal on the basis of characteristics extracted by the characteristic extraction section; and
    a normalization/recognition section that codes and outputs a final result by carrying out a timing normalization and a classifying process using a radial basis function (RBF) neural network on the basis of the voice characteristics provided by said characteristic extraction section and the information of the start-point and the end-point of a voice signal from said word boundary detection section.

2. A speech recognition system as claimed in claim 1, wherein said characteristic extraction section is characterized by directly calculating the characteristic vectors at zero-crossing points of the output signal of the FIR filter section and accumulating them, without storing the output signals of the FIR filtering section.

3. A speech recognition system as claimed in claim 2, further comprising registers for each channel to accumulate said calculated characteristic vectors.

4. A speech recognition system as claimed in claim 3, wherein said registers comprise:
    a register for accumulating the characteristic vectors for a total time interval of 110 samples;

registers for accumulating the characteristic vectors only for the valid time of each channel; and a buffering register for storing the characteristic vectors of the total time interval.

5. A speech recognition system as claimed in claim 1, wherein said FIR filter is a cochlea FIR filter having limited coefficients.

6. A speech recognition system as claimed in claim 5, wherein said FIR filter is characterized by containing a command language to limit the coefficients of powers-of-two conversion by using the characteristics of said cochlea FIR filter.

7. A speech recognition system as claimed in claim 1, wherein said FIR filter is characterized by embodying a filter-bank with only additions and shift-operations by using powers-of-two conversion.

8. A speech recognition system as claimed in claim 1 further comprising a non-synchronized SRAM, wherein said SRAM is characterized by storing the characteristics extracted from said characteristic extraction section and being read by said normalization/recognition section.

* * * * *